United States Patent [19]

Lippert et al.

[11] 3,796,317

[45] Mar. 12, 1974

[54] SYSTEM FOR TREATING DILUTE SLURRIES

[75] Inventors: Thomas E. Lippert, Monroeville; Charles D. Beristain, Pittsburgh; Michael Testa, Irwin, all of Pa.

[73] Assignee: Westinghouse Electric Corporation, Pittsburgh, Pa.

[22] Filed: Nov. 10, 1972

[21] Appl. No.: 305,388

[52] U.S. Cl............ 210/386, 100/118, 100/152, 210/393, 210/401
[51] Int. Cl........................................ B01d 33/04
[58] Field of Search............ 100/116, 118, 151–154; 210/66, 351, 386–388, 396, 400, 401, 393

[56] References Cited
UNITED STATES PATENTS

| | | | |
|---|---|---|---|
| 3,699,881 | 10/1972 | Levin et al.......................... | 100/118 |
| 3,601,039 | 8/1971 | Schover............................. | 100/118 |
| 3,613,564 | 10/1971 | Adamski et al.................... | 100/118 |
| 3,459,122 | 8/1969 | Pastoors et al. ................. | 210/400 X |
| 2,983,383 | 5/1961 | Wallace et al.................... | 210/401 X |
| 2,097,529 | 11/1937 | Nordell........................... | 210/396 X |
| 1,550,293 | 8/1925 | Walker............................ | 210/396 X |

Primary Examiner—John Adee
Assistant Examiner—Robert H. Spitzer
Attorney, Agent, or Firm—J. R. Campbell

[57] ABSTRACT

A system for removing water from dilute slurries of the type discharged from waste water treatment plants, including feeding the dilute slurry into a reservoir and passing concentrically mounted endless screen and porous belts through the reservoir for absorbing water from the slurry. The water is squeezed from the belts and the thus thickened slurry is transported from the reservoir to a position for discharge onto the screen belt which moves in intimate contact with the porous belt. Such intimate contact facilitates further removal of water from the slurry by capillary action as the belts move linearly towards the end of the system. The belts then separate from each other. Water is squeezed from the porous belt and the screen belt with its slurry cake then runs through a pair of rollers for further slurry dewatering and compaction to a desired solids concentration. The thus dewatered slurry cake is then transferred to one of the rollers and subsequently removed from the system for ultimate disposal.

9 Claims, 3 Drawing Figures

PATENTED MAR 12 1974   3,796,317

SYSTEM FOR TREATING DILUTE SLURRIES

BACKGROUND OF THE INVENTION

The invention described herein relates to waste liquid treatment systems and more particularly to a system for extracting liquid from dilute slurries by separately utilizing the capillary force produced by porous materials and the force resulting from mechanical compression of a thickened slurry.

In operating municipal or industrial waste water or sewage treatment plants, the process of extracting water from dilute slurries, such as waste activated sewage sludge discharged from a sewage system final settling tank, is an expensive and generally inefficient and time consuming process. In normal operation, this sludge or slurry is discharged to a digester and vacuum drum filter which effects removal of sufficient water to provide an activated sludge having up to 20 percent solids in the slurry. Dewatering of the sludge is essential to successful operation of the system in order to minimize handling and transportation costs, fuel costs when heat drying of the slurry is resorted to, and to reduce the load demands imposed on the system when the extracted water is recirculated in the treatment plant.

U.S. patent application Ser. No. 184,675, filed Sept. 29, 1971, by C. D. Beristain et al entitled "Sludge Dewatering Apparatus and Process" and assigned to the Westinghouse Electric Corporation, discloses an apparatus and process which helps resolve current prior art problems in this field. Beristain et al. teach the concept of dewatering sludge by depositing a dilute slurry on a pair of concentrically mounted endless belts. One endless belt of screenlike material which initially receives the dilute slurry, acts to separate about 20 percent to 45 percent of the free water from the slurry mix. The screen, with its slightly dewatered slurry, then moves into contact with an endless porous belt which absorbs additional water from the slurry. As the porous belt becomes saturated, it is separated from the screen belt and the absorbed water squeezed out to prepare it for the next repetitive cycle. The screen belt, however, which carries the substantially dewatered slurry cake is passed through a set of compression rollers which further dewaters the slurry while simultaneously transferring the slurry cake to one of the rollers for subsequent removal by a knife edge or other device. The invention described in this application is an improvement on the system disclosed in the above Beristain et al patent application.

Further developmental work carried out on the above system showed the desirability of utilizing a relatively long reservoir through which the screen and porous belts move and thereby preferentially absorb water from the slurry while at that time, still keeping the belts relatively free of slurry solids. It further was discovered that the system would respond more efficiently to the thickened slurry after partial dewatering if it were deposited directly on the screen, rather than being picked up by the belts, in order to secure further dewatering in the next part of the cycle.

BRIEF SUMMARY OF THE INVENTION

An object of the invention is to provide an improved system for effecting the extraction of liquid from dilute slurries by providing apparatus which quickly absorbs a substantial portion of the liquid by capillary action without sludge cake formation.

Another object of the invention is the provision of apparatus for moving dewatered slurry to a position for deposition on an endless porous belt for further dewatering and sludge cake formation.

Briefly stated, the above objects of our invention are achieved by providing a system for treating waste water dilute slurries wherein a slurry is partially dewatered by passing screen and porous belts through the slurry and transferring solids therefrom to a container for later discharge onto the screen and porous belts for further dewatering. Still further dewatering is accomplished by passing the slurry cake through coacting rollers which also effects transfer of the slurry cake onto a roller for removal from the system.

BRIEF DESCRIPTION OF THE DRAWINGS

The subject matter which we regard as our invention is particularly pointed out and distinctly claimed in the concluding portion of this application. Our invention, however both as to organization and method of operation, together with further objects and advantages thereof, may best be understood by reference to the following description taken in connection with the accompanying drawings in which:

DETAILED DESCRIPTION OF INVENTION

Figure 1:
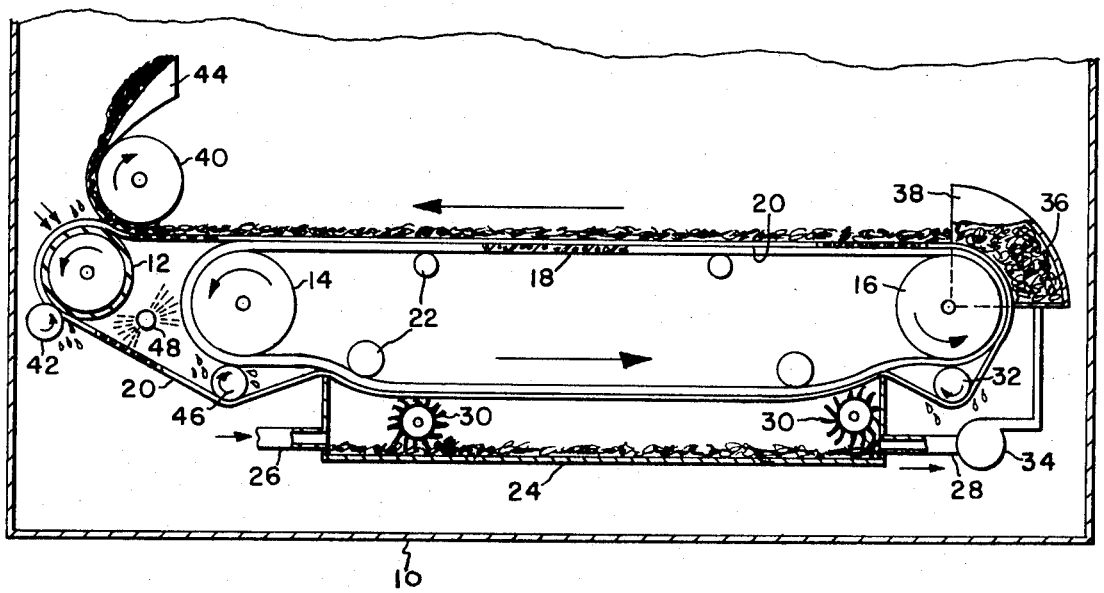
FIG. 1 is a schematic showing of apparatus for extracting liquid from dilute slurries and providing a thickened slurry cake for discharge from the system.

Referring now to the drawings wherein like reference characters designate like or corresponding parts throughout the several views, there is shown in FIG. 1 apparatus for dewatering a liquid slurry to achieve maximum water withdrawal and thereby provide a slurry cake which may conveniently be handled and transported and which will require minimum fuel for heat or combustion in those cases where the slurry is dried or burned. It is to be understood that slurries envisioned to be treated by the apparatus described herein are those which initially contain a large amount of liquid, such as water, relative to the solids content. In the usual situation, such dilute slurries cannot be directly discharged to a river or stream and the solids must be removed therefrom to provide a relatively clear liquid effluent, and solids of a type which will not adversely affect or pollute the environment. Illustrative of such dilute slurries are those which are discharged from a final settling tank in a municipal or industrial waste water treatment or sewage system, slurries which are discharged from paper-making or wood treating factories, or other chemical operations. In the example chosen to illustrate the invention, dilute slurry is removed from the final settling tank of a sewage system and delivered directly to the apparatus described herein rather than to a sludge digester and vacuum drum filters of the prior art which currently are used to dewater the activated sludge.

The apparatus consists of a base 10 supporting suitably mounted drive rollers 12 and 14 and idler roller 16. The drive rollers 12 and 14 are driven by conventional motor and chain and sprocket assemblies (not shown) or through a direct connected variable speed drive motor capable of rotating the drive rollers at a predetermined speed. A preferably non-biodegradable endless porous belt 18 is mounted on the rollers 14 and 16 while an endless screen belt 20, made of similar non-biodegradable material is mounted on the roller 12 and idler 16. As shown, the belts 18 and 20 are concentrically disposed with respect to each other and are caused to move at an appropriate linear speed by the drive motors. The belts are maintained in intimate contact with each other throughout a major portion of their length by guide rollers 22 and by proper adjustment of belt and screen tension. It has been found in some applications that maintaining a slight relative motion between the screen belt and porous belt aids in intimate contact between the screen and belt and aids in extraction of water from the slurry.

A reservoir 24 having an inlet 26 and outlet 28 is mounted below the belts and extends throughout a substantial portion of the porous belt length. Dilute slurry from a sewage system final settling tank or from a paper mill, for example, is fed to the reservoir and slurry is maintained at a depth therein to permit the screen and porous belts to be slightly submerged in order to maintain a hydraulic head on the belts. Motor driven brushes 30 or other solids removal devices are mounted in the reservoir and are located in a position to remove solids from the belt as they move along the reservoir length.

Since the function of porous belt 18 is to absorb liquid i.e., water, from the dilute slurry, it is important that the belt have the proper liquid absorbent characteristics. It must be constructed in a manner to produce a capillary force sufficient to absorb a maximum quantity of water from the slurry while still being of a size to easily be dewatered by idler roller 16 and compression roller 32 when the belt leaves the reservoir. The water thus extracted by the compression rollers may conveniently be returned to the sewage system used in the wash cycle 48 or discharged to a river or stream, depending on its quality. The porous belt consists of a flexible porous material having minimum rigidity. A high density synthetic belt such as polypropylene, nylon, rayon, dacron or an open cell polyurethane foam are examples of acceptable materials. In an alternative construction, the porous belt may be covered with a high mesh filter screen to prevent clogging of the interstitial spaces between adjacent fibers in the belt material in those situations where the porous belt is passed through the reservoir without the screen belt covering. In one modification, the belt is comprised of individual fibers approximately 43 microns in diameter, 4½ inches long, belt thickness in the range of one-half inch to nine-sixteenths inch, between 85 percent and 95 percent voids in the belt material and weight of 7.1 oz/ft². When constructed properly, the belt is capable of transferring free water therethrough in 20–30 seconds under the influence of gravity alone when the amount of water or similar liquid on its top surface is approximately that amount which would overflow the belt.

The screen 20 likewise is made of a non-biodegradable material having pores of a size just sufficient to permit drainage but still small enough to preclude passage of most of the solids carried on the screen surface. Its function is to support the slurry cake on its upper surface while staying in intimate contact with the upper surface of the porous belt 18.

Figure 2:
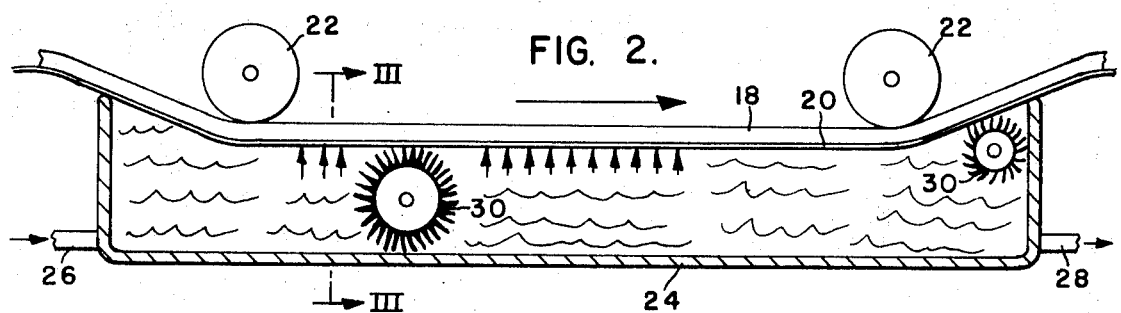
FIG. 2 is an improved design of reservoir used for initially extracting water from a liquid slurry.
Figure 3:
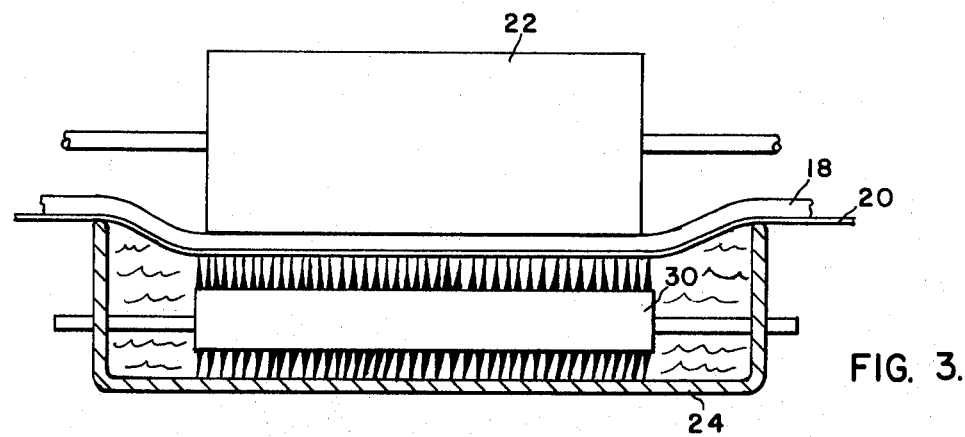
FIG. 3 is a view taken on lines III—III of FIG. 2.

When the porous belt 18 and screen belt 20 are fed into the reservoir 24, the belts are in intimate contact with one another and water is absorbed from the dilute slurry by the capillary forces acting on the porous belt. The free water is therefore drawn into the pore space of the belt by capillarity. The small hydrostatic pressure across the screen belt resulting from its submergence in the slurry, forces the liquid through the protective screen and into the capillary belt as illustrated in FIG. 2. This action results in thickening the dilute slurry from less than 1 percent to about 3 percent solids and thus enhances the solids loading rate on to the screen belt as described hereafter.

To help assure non-settling of solids in the slurry to the bottom of the reservoir, the slurry is kept in turbulent motion by the brushes but whose prime function is to prevent solids from gathering on the screen. Upon discharge from the reservoir, the porous belt which at this point is fully saturated with water, is subsequently squeezed by rollers 16 and 32 thereby releasing the entrained liquid by the force of compression. As indicated previously, the liquid thus released from the belt may be discharged from the system or used to wash the screen or belt.

Since some of the water has been removed from the slurry, the resulting mixture is much thicker and is transferred by pump 34 from the reservoir to a thickened slurry container 36 mounted on base 10 adjacent the idler roller 16. It will be apparent that depending on the orientation of the component parts in the system, the container 36 may be located below the idler roller 16 and the slurry therefore will be gravity fed into the container. In such an installation, it may be desirable to utilize a second porous belt-screen belt arrangement.

Since it is important that the thickened slurry be fed onto the screen 20 at a controlled feed rate and geometry, a control gate 38 is located in the container 36 and is effective to provide a uniform layer of slurry on the screen, both in width and thickness.

It will be noted that the porous belt 18 and the screen belt 20 are placed in intimate contact with one another as they revolve around idler roller 16 and the belts stay in this position until a slurry cake formed on the screen is removed. In this step of the cycle, it is essential that both belts be maintained in intimate contact with one another to effect extraction and transfer of water from the slurry to the porous belt by viscous and capillary action. As the belts move linearly, the thickened slurry is concentrated to about 8 percent to 10 percent solids as the liquid is extracted. As disclosed in the above-mentioned Beristain et al patent application, a number of porous belt dewatering stations may be located along the length of the belt to remove the entrained water. This arrangement would merely consist of three rollers located in the same horizontal plane directly beneath the porous belt 18 and one roller immediately beneath the central roller, the arrangement being such that the belt is required to move over a first roller, between the central and lower rollers and above the third roller where it continues its linear movement towards the other end of the system.

As the belts proceed to the left as shown in FIG. 1, a slurry cake is formed on top of the screen belt 20. By the time it reaches the point adjacent drive roller 12, the slurry cake has attained sufficient structural integrity to be further compressed for the purpose of removing an additional amount of liquid without destroying the cake formation. This is accomplished by providing a compression roller 40 with a smooth surface, such as TEFLON, on the near side of drive roller 12 so that as the screen belt 20 separates from the porous belt 18 at drive roller 14, the slurry cake is conveyed between drive roller 12 and compression roller 40. An external pressure load is therefore applied to the slurry cake as it moves between the rollers. The applied load and particular arrangement accomplishes two functions. First, it increases the solids content in the slurry cake to about 18 percent, and secondly, effects the transfer of the slurry cake from the screen surface to a second, more abrasive resistant, surface. Alternatively, rollers 12 and 14 may be incorporated in a single roller which would serve the dual function of a drive roller and a dewatering roller.

To help facilitate removal of liquid from the screen belt, an additional roller 42 is mounted adjacent drive roller 12 so that as the screen belt 20 passes therethrough any additional water in the screen belt will be effectively removed by the compressive force exerted by the rollers. To remove the slurry cake thus transferred to the compression roller 40 a knife 44 having its edge adjacent the roller surface is mounted on the receptacle to achieve slurry cake removal in a manner well known in the art.

As the porous belt 18 separates from the screen belt 20 near drive roller 14, the porous belt continues around roller 14 and water is removed therefrom by the compressive force exerted by the roller 46 as the porous belt moves between the roller 14 and 46 surfaces. After belt dewatering, the belts are again fed into the reservoir 24 to repeat the above described cycle. Since it is important that at least the porous belt and preferably the screen belt also be cleansed of solid particulate matter which might otherwise clog the pores in the belts, water is injected from a nozzle 48 onto the belts to effectively wash them of solid matter. This water can be the previously extracted porous belt water.

In view of the above, it will be apparent that many modifications and variations are possible in light of the above teachings. It, therefore, is to be understood that within the scope of the appended claims, the invention may be practiced other than as specifically described.

What is claimed is:

1. Apparatus for dewatering a dilute slurry comprising:
    a base including spaced rotatable means;
    a drive means on said base;
    an endless screen belt mounted for linear movement on said drive means and one of said rotatable means, said belt being preferably made of a nonbiodegradable material having pores of sufficient size therein to freely pass water but to hold solids on the belt surface;
    an endless porous belt supported for linear movement on said spaced rotatable means, said belt having the characteristics of absorbing and holding water;
    said screen and porous belts being concentrically disposed with respect to each other but maintained in intimate contact throughout a major portion of their length;
    a reservoir on said base for holding said dilute slurry, said reservoir being positioned to have at least the porous belt move therethrough, said belt being effective to absorb free water in said slurry;
    dewatering means located at predetermined positions along the porous belt length and beyond the reservoir for removing water from the porous belt as it is moved linearly by said rotatable means;
    means for moving the slurry from said reservoir onto the screen belt so that as the screen and porous belts move linearly in contact with each other, the porous belt draws water from the slurry and thus leaves a slurry cake on said screen belt; and
    means for removing said cake from said screen belt.

2. The apparatus according to claim 1, wherein the dilute slurry in the reservoir is maintained at a height sufficient to submerge the porous and screen belts as they pass therethrough; and
    pump means connected to the outlet of said reservoir for pumping the slightly dewatered slurry therein to a position for discharge onto said screen belt.

3. The apparatus according to claim 2 including means mounting a container on said base adjacent one of said rotatable means; and
    conduit means connecting the outlet of said pump with the container from which the thickened slurry is deposited on the screen belt.

4. The apparatus according to claim 3, wherein thickened slurry control means is mounted on said container for controlling the geometry and rate of discharge of the thickened slurry onto said screen belt.

5. The apparatus according to claim 4 wherein porous belt support means are located along the capillary belt length for maintaining said screen and porous belts in intimate contact with each other to thereby effect the transfer of water from said slurry by capillary action to the porous belt.

6. The apparatus according to claim 5 including brushes mounted in said reservoir in a position to contact said screen for removing solid particles therefrom as the screen and porous belts move linearly through said reservoir.

7. The apparatus according to claim 5 wherein porous belt dewatering means are positioned adjacent the discharge end of said reservoir for removing water from said porous belt before said thickened slurry is deposited on the screen belt.

8. The apparatus according to claim 5 wherein said drive means is located outwardly from said rotatable means to permit separation of the screen and porous belts near said pulley;
    a compression roller on said base spaced from said drive means a distance sufficient to slightly compress the slurry cake as it passes therethrough; and said compression roller having surface characteristics such that the slurry cake is transferred from said screen belt to the compression roller, and means for removing said cake from said roller.

9. The apparatus according to claim 8 wherein a second roller is positioned adjacent to and spaced from said drive means a distance sufficient to allow passage of the screen belt therebetween to dewater the screen prior to movement of the belt into said reservoir.

* * * * *